United States Patent [19]
Stähle et al.

[11] Patent Number: 4,607,564
[45] Date of Patent: Aug. 26, 1986

[54] BLOWER HOUSING ARRANGEMENT

[75] Inventors: Werner Stähle, Sindelfingen; Karl-Heinz Weller, Gerlingen; Albert Stolz, Tübingen, all of Fed. Rep. of Germany

[73] Assignee: Daimler-Benz Aktiengesellschaft, Fed. Rep. of Germany

[21] Appl. No.: 662,556

[22] Filed: Oct. 19, 1984

[30] Foreign Application Priority Data

Oct. 26, 1983 [DE] Fed. Rep. of Germany ....... 3338775

[51] Int. Cl.[4] ............................................. B60H 1/24
[52] U.S. Cl. ........................................ 98/2; 98/2.05; 415/174
[58] Field of Search ................. 98/2, 2.05; 415/9, 174

[56] References Cited

U.S. PATENT DOCUMENTS

| | | | |
|---|---|---|---|
| 3,366,026 | 1/1968 | Herr | 98/2 |
| 3,598,197 | 8/1971 | Neece | 98/2 |
| 3,762,303 | 10/1973 | Hoffman | 98/2 |
| 3,814,001 | 6/1974 | Hill | 98/2 |
| 3,877,355 | 4/1975 | Iizuka | 98/2 |
| 3,976,393 | 8/1976 | Larson | 415/219 R |
| 4,311,439 | 1/1982 | Stofen | 415/313 |
| 4,345,874 | 8/1982 | Ozeki et al. | 415/9 |
| 4,377,370 | 3/1983 | Porcelli | 415/174 |
| 4,413,550 | 11/1983 | Piano | 98/2 |

FOREIGN PATENT DOCUMENTS

3048195 9/1982 Fed. Rep. of Germany ............ 98/2

Primary Examiner—Henry C. Yuen
Attorney, Agent, or Firm—Barnes & Thornburg

[57] ABSTRACT

In a blower housing arrangement for a motorized vehicle of the type with a blower encased by a housing followed by a duct system, a preferably open-pore foam material is utilized for noise damping, this foam material being sealed at least on the inside of the housing by means of a skin. This foam material is locally supported and bordered along the edges by wall sections of the housing and/or of the duct system so that, in this zone, the foam material is the sole means of forming the wall. The wall sections constitute a skeleton which, at least during normal driving operation, is dimensionally rigid and supportive and which serves for the accommodation of installation components, operating parts, and mounting elements.

3 Claims, 1 Drawing Figure

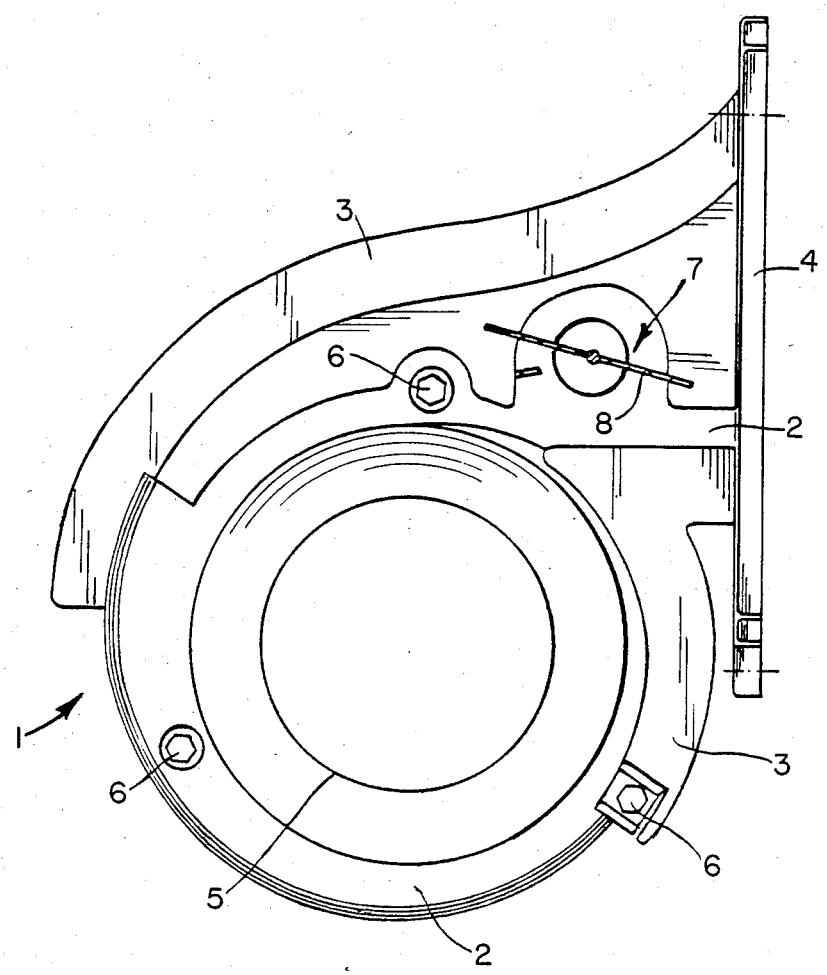

BLOWER HOUSING ARRANGEMENT

BACKGROUND AND SUMMARY OF THE INVENTION

The invention relates to a blower with a housing encasing same and/or with a duct system adjoining same, an open-pore foam material preferably sealed by a skin toward the source of the noise being provided locally for noise reduction, this foam material being utilized as the sole means to form the wall of the housing and/or of the duct system.

A blower of such a construction, arranged in the zone of the radiator of an internal combustion engine and comprising an impeller surrounded by foam material and having a free air outlet adjacent to the noise damping means is disclosed in German Published Unexamined Patent Application (DE-OS) No. 2,506,364.

In automobile heating systems a supporting function is also carried out by the housing accommodating the blower which latter can be operated at varying rotational speeds. This blower housing represents a part of a heater box equipped with attachments and installations as well as a duct system. It is, therefore, an object of the invention to utilize the measures for noise damping known from DE-OS No. 2,506,364 in such an integrated blower, without impairing the supportive properties during normal driving operation and without incurring an intolerable extra amount of weight.

For this reason, a blower of the type discussed above is proposed according to the invention, wherein the foam material is respectively supported and marginally bordered by wall sections of the housing and/or of the duct system and wherien these wall sections constitute a skeleton whcih, at least during normal driving operation, is dimensionally rigid and supportive, this skeleton serving for the accommodation of installation components, operating parts, and mounting elements.

A supporting ability adequate in normal driving operation coupled with a crash characteristic which is advantageous in case of a collision, is attained according to the invention by providing that at least the wall sections oriented predominantly in the longitudinal direction of the vehicle exhibit a predetermined buckling resistance which, in case of an accident, is exceeded, utilizing the foam material for additional energy absorption when the wall sections are buckling.

A saving in weight and a simple, economical design of blocking or control elements are obtained according to preferred embodiments of the invention wherein the foam material also serves as a gasket in the contact zone of adjustable air control flaps.

Further objects, features, and advantages of the present invention will become more apparent from the following description when taken with the accompanying drawing which shows, for purposes of illustration only, an embodiment construction in accordance with the present invention.

BRIEF DESCRIPTION OF THE DRAWING

The single drawing FIGURE is a sectional view taken along a plane extending perpendicular to the fan blower rotational axis with one of the two blower housing parts removed to facilitate illustration of the housing constructed in accordance with a preferred embodiment of the present invention.

DETAILED DESCRIPTION OF THE DRAWING

A blower housing 1 consisting of two parts, only one part being illustrated for the sake of simplicity and clarity, is composed of wall sections 2 and of a foam material 3 serving for noise attenuation. This foam material 3 preferably exhibits open pores sealed at least on the inside of the housing by means of a skin. This skin prevents the foam material 3 from absorbing moisture and dust contained in the conveyed air, which moisture and dust could otherwise impair the noise absorption characteristics and lead to troublesome odors. At the same time, flow dynamic losses on account of a rough surface are avoided by the skin.

The housing 1 is bounded by a flange 4 which, in a manner not shown in detail, is held by the end wall of a vehicle interior, an expansive duct system following on the side of the interior. In the illustrated embodiment, the wall sections 2 facing the interior of the vehicle form a skeleton by means of which the foam material 3 is respectively supported and bordered along the edges. This skeleton, which can also penetrate the foam material 3, and the wall sections 2 that are oriented predominantly in the longitudinal direction of the vehicle exhibit a predetermined buckling resistance and accommodate installation components, for example in the form of a radial-flow fan, of which only the impeller 5 is indicated in the drawing. Furthermore, these wall sections 2 serve for the holding of mounting elements 6 and operating parts 7, of which merely a flap 8 is visible. This flap 8 does not require the otherwise customary marginal gasket since this function is fulfilled by the associated adjacent section of the foam material 3.

In case of an excessive stress on the housing 1 caused by a collision, a controlled deformation of the housing begins, on account of the predetermined buckling strength of the aforementioned wall sections 2, the foam material 3 being additionally utilized for energy absorption.

In other non-illustrated preferred embodiments, the zone of the housing 1 remote from the interior is additionally provided with noise-damping foam material in the manner described above; in this connection, it is furthermore contemplated to utilize a relatively fine-pore PUR (Polyurethane) foam having a density of about 80 g/dm$^3$ (grams/cubic decimeter). By the above-described measures, the noise transmission of engine and driving noises to the interior is markedly reduced, even if the blower is at a standstill.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. Blower housing arrangement for housing a blower fan and forming a connection with a duct system in a motorized vehicle, comprising:
    noise reducing open-pore foam material means forming a substantial part of the wall portions surrounding the blower fan, said substantial part of the wall portions comprised of open-pore foam material defining a space through which air is guided from said blower fan to the duct system leading into the passenger space of a vehicle,
    and skeleton supporting means, substantially surrounded in part by said foam material means, for aiding in supporting the foam material wall portions, said skeleton supporting means being dimensionally rigid and supportive during normal driving operations with said blower housing arrangement in the motorized vehicle, said skeleton supporting means including accommodation means for accommodating components, operating parts, installation mounting elements and the like, wherein at least the skeleton supporting means oriented predominately in the vehicle longitudinal direction exhibits a predetermined buckling resistance which is exceeded during a vehicle accident collision, wherein, upon buckling of the skeleton supporting means the foam material wall portions facilitate energy absorption, wherein said foam material wall portions serve as gasket means for adjustable air flap means.

2. An arrangement according to claim 1, wherein said open-pore foam material is comprised of fine-pore PUR (Polyurethane) foam having a density of about 80 g/dm$^3$ (grams/cubic decimeter).

3. An arrangement according to claim 1, further comprising a skin means for preventing said foam material from absorbing moisture and dust, wherein said open-pore foam material is sealed by said skin means, at least on the inside of said housing.

* * * * *